(12) United States Patent
Nakabayashi et al.

(10) Patent No.: US 9,262,114 B2
(45) Date of Patent: Feb. 16, 2016

(54) INFORMATION APPARATUS AND INFORMATION PROCESSING SYSTEM

(71) Applicants: Kei Nakabayashi, Kanagawa (JP);
Kenji Yamada, Tokyo (JP)

(72) Inventors: Kei Nakabayashi, Kanagawa (JP);
Kenji Yamada, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/140,628

(22) Filed: Dec. 26, 2013

(65) Prior Publication Data
US 2014/0198342 A1 Jul. 17, 2014

(30) Foreign Application Priority Data

Jan. 11, 2013 (JP) ................................. 2013-003922

(51) Int. Cl.
*G06F 15/00* (2006.01)
*G06F 3/12* (2006.01)
*H04N 1/00* (2006.01)

(52) U.S. Cl.
CPC .............. *G06F 3/1288* (2013.01); *G06F 3/126* (2013.01); *G06F 3/1212* (2013.01); *G06F 3/1291* (2013.01); *H04N 1/00344* (2013.01); *H04N 2201/0072* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2004/0249956 A1* | 12/2004 | Tanimoto | 709/227 |
| 2013/0201517 A1* | 8/2013 | Blanchard et al. | 358/1.15 |
| 2013/0329258 A1* | 12/2013 | Pettis et al. | 358/1.15 |
| 2014/0094182 A1* | 4/2014 | Sato | 455/450 |

FOREIGN PATENT DOCUMENTS

| | | |
|---|---|---|
| JP | 2007-228346 | 9/2007 |
| JP | 2012-095171 | 5/2012 |

\* cited by examiner

*Primary Examiner* — Helen Q Zong
(74) *Attorney, Agent, or Firm* — IPUSA, PLLC (57) ABSTRACT

An information apparatus includes an apparatus information obtaining unit that obtains apparatus information from a plurality of apparatuses connected via a network to the information apparatus, an apparatus selection unit that selects a target apparatus from the plurality of apparatuses based on the obtained apparatus information, and a process result obtaining unit that sends a request to the target apparatus to request the target apparatus to perform a process corresponding to the request, and obtains a result of the performed process from the target apparatus.

13 Claims, 12 Drawing Sheets

ADDRESS BOOK CENTRAL MANAGEMENT SETTING

SYNCHRONIZATION OF ADDRESS BOOK HAS BEEN
SUCCESSFULLY COMPLETED

ADDRESS BOOK CENTRAL MANAGEMENT SETTING

SELECT HOST APPARATUS

| APPARATUS NAME (IP) | JOB STATUS |
|---|---|
| ○ MPC5001(10.60.11.22) | 0 |
| ● MPC5001(10.60.12.23) | 2 |
| ○ MPC4001(10.60.13.33) | 10 |
| ○ MP3000 (10.60.14.44) | 6 |

SELECT   CANCEL

|   | IP ADDRESS | APPARATUS NUMBER | APPARATUS NAME |
|---|---|---|---|
| 1 | 10.60.91.11 | abc-7B0001 | PRINTER1 |
| 2 | 10.60.91.31 | abc-7B0002 | PRINTER2 |
| 3 | 10.60.91.52 | abc-7B0003 | PRINTER3 |

FIG.12

|  | A | B | C |
|---|---|---|---|
| JOB STATUS | 2 | 4 | 10 |
| NETWORK STATUS | 50 Mbps | 2 Mbps | 30 Mbps |
| SCHEDULED PROCESS | 3 | 0 | 12 |

FIG.13

|  | A | | B | | C | |
|---|---|---|---|---|---|---|
| JOB STATUS | 2 | 5 PTS | 4 | 3 PTS | 10 | 1 PTS |
| NETWORK STATUS | 50 Mbps | 5 PTS | 2 Mbps | 1 PTS | 30 Mbps | 3 PTS |
| SCHEDULED PROCESS | 3 | 3 PTS | 0 | 5 PTS | 12 | 1 PTS |
| TOTAL | | 13 PTS | | 9 PTS | | 5 PTS |

INFORMATION APPARATUS AND INFORMATION PROCESSING SYSTEM

CROSS-REFERENCE TO RELATED APPLICATION

The present application is based upon and claims the benefit of priority of Japanese Patent Application No. 2013-003922, filed on Jan. 11, 2013, the entire contents of which are incorporated herein by reference.

BACKGROUND OF THE INVENTION

1. Field of the Invention

An aspect of this disclosure relates to an information apparatus and an information processing system.

2. Description of the Related Art

There exists a system where networked apparatuses (e.g., image forming apparatuses such as multifunction peripherals and laser printers) collaborate with each other to provide various functions. Japanese Laid-Open Patent Publication No. 2012-095171, for example, discloses a system where one of apparatuses in the system functions as a host apparatus, the remaining apparatuses function as client apparatuses, and the host apparatus centrally manages address book data shared by the apparatuses.

However, Japanese Laid-Open Patent Publication No. 2012-095171 merely discloses that the host apparatus centrally manages address book data including frequently-used addresses or destinations, and does not disclose how the host apparatus is selected. Here, when the performance of the host apparatus is low or the host apparatus is frequently used, the host apparatus cannot respond quickly to requests from client apparatuses and cannot provide a central management function effectively. Also, due to the load of the central management function, the processing speed of the entire host apparatus may be reduced.

SUMMARY OF THE INVENTION

In an aspect of this disclosure, there is provided an information apparatus including an apparatus information obtaining unit that obtains apparatus information from a plurality of apparatuses connected via a network to the information apparatus, an apparatus selection unit that selects a target apparatus from the plurality of apparatuses based on the obtained apparatus information, and a process result obtaining unit that sends a request to the target apparatus to request the target apparatus to perform a process corresponding to the request, and obtains a result of the performed process from the target apparatus.

DESCRIPTION OF THE PREFERRED EMBODIMENTS

Preferred embodiments of the present invention are described below with reference to the accompanying drawings.

<System Configuration>

Figure 1:
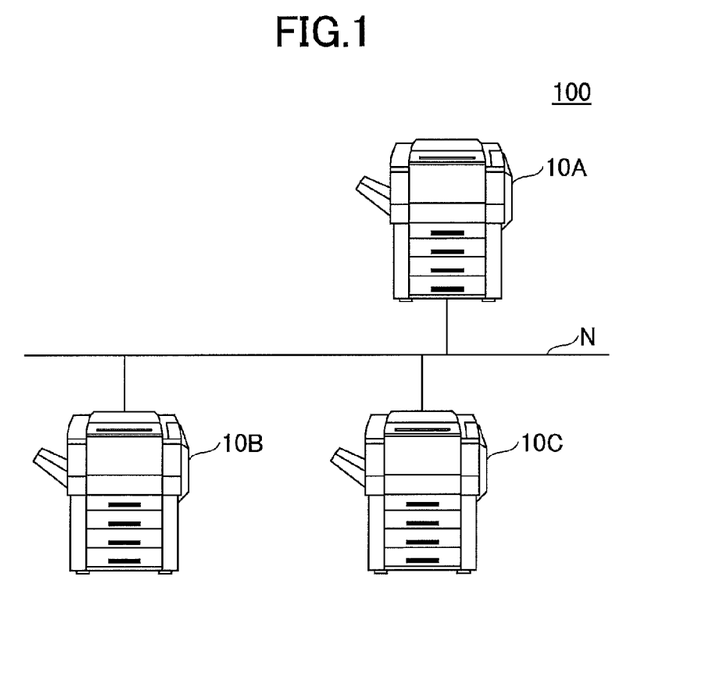
FIG. 1 is a drawing illustrating an exemplary configuration of an information processing system.

FIG. 1 is a drawing illustrating an exemplary configuration of an information processing system 100 according to an embodiment of the present invention. As illustrated by FIG. 1, the information processing system 100 may include image forming apparatuses 10A through 10C (which may also be referred to as "the image forming apparatuses 10" and "the image forming apparatus 10" when it is not necessary to distinguish between them) that are examples of information apparatuses. The number of image forming apparatuses 10 is not limited to three. The image forming apparatuses 10A through 10C are connected to each other via a network N and can communicate with each other. The network N is, for example, the Internet, a wide area network (WAN), a local area network (LAN), or a combination of two or more of them.

Each of the image forming apparatuses 10A through 10C may be implemented, for example, by a multifunction peripheral (MFP) including a scan function, a copy function, a printer function, and a facsimile function. Also, each of the image forming apparatuses 10A through 10C may be implemented by any other information apparatus such as a mobile terminal, a smartphone, a personal computer, or a projector.

In the example of FIG. 1, it is assumed that each of the image forming apparatuses 10A and 10B includes a function to serve as a host apparatus (first apparatus) that performs a process in response to a request from the image forming apparatus 10C. Also in the example of FIG. 1, it is assumed that the image forming apparatus 10C includes a function to serve as a client apparatus (second apparatus) that sends a request to the host apparatus.

Examples of requests sent from the client apparatus may include an acquisition request to obtain information commonly held by the host apparatuses from a selected host apparatus and an authentication request to request the selected host apparatus to authenticate the client apparatus. The information commonly held by the host apparatuses may indicate information that is synchronized among or shared by apparatuses. For example, the information commonly held by the host apparatuses may be address book information (including, for example, scanned images, facsimile destinations, and user information) that is synchronized among apparatuses.

Another example of the information commonly held by the host apparatuses is apparatus configuration information indicating settings to be applied by the host apparatuses to the client apparatus. In the descriptions below, it is assumed that the client apparatus sends an acquisition request to obtain address book information from the host apparatuses.

Also in the descriptions below, it is assumed that the image forming apparatus 10C that services as a client apparatus includes a list (host apparatus list) of apparatuses (in the example of FIG. 1, the image forming apparatuses 10A and 10B) that serve as host apparatuses and perform processes in response to requests from the client apparatus.

In the example of FIG. 1, it is assumed that the image forming apparatus 10C includes an input unit such as an operations panel used by a user (e.g., an administrator) to input various commands and information. When an address book central management request for requesting synchronization of address book information is received via the operations panel, the image forming apparatus 10C sends an apparatus information acquisition request to each of apparatuses in the host apparatus list to request apparatus information regarding each of the apparatuses.

When receiving the apparatus information from each of the apparatuses, the image forming apparatus 10C selects (or determines), based on a predetermined criterion, one of the apparatuses as a host apparatus that performs a process in response to an address book information acquisition request for address book information. Then, the image forming apparatus 10C obtains the address book information from the selected apparatus to perform a synchronization process.

The above configuration makes it possible to select a suitable apparatus as a host apparatus from multiple apparatuses connected to a network so that the selected host apparatus can quickly perform processes in response to requests from a large number of client apparatuses.

<Another System Configuration>

Figure 2:
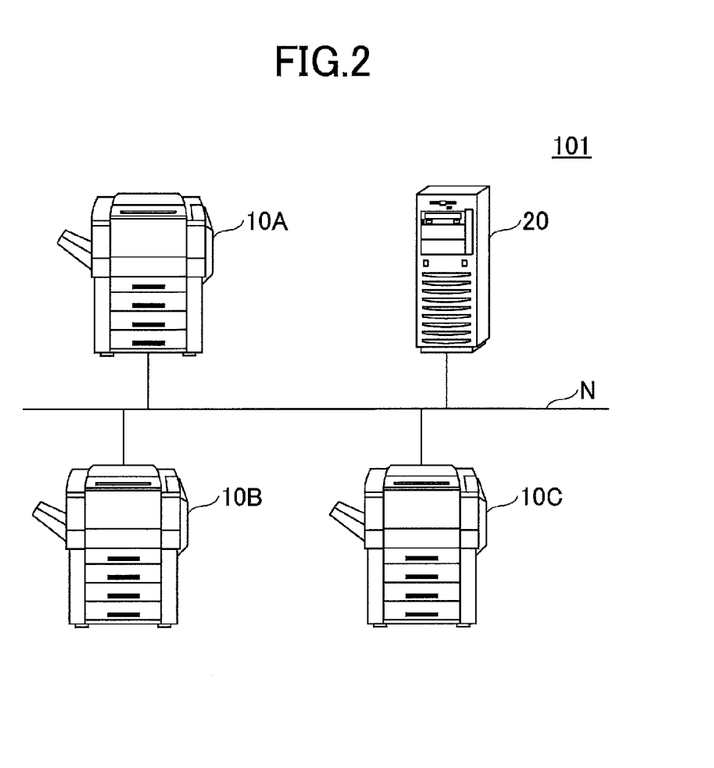
FIG. 2 is a drawing illustrating another exemplary configuration of an information processing system.

FIG. 2 is a drawing illustrating an exemplary configuration of an information processing system 101 according to another embodiment of the present invention. As illustrated by FIG. 2, the information processing system 101 may include image forming apparatuses 10A through 10C and a server 20 that is an example of an external apparatus. The image forming apparatuses 10A through 10C and the server 20 are connected to each other via a network N and can communicate with each other.

The information processing system 101 of FIG. 2 is different from the information processing system 100 of FIG. 1 in that the server 20 is added. Therefore, the server 20 is mainly described below.

In the example of FIG. 2, it is assumed that the server 20 includes a host apparatus list. When receiving an apparatus information acquisition request for apparatus information of apparatuses in the host apparatus list from the image forming apparatus 10C (client apparatus), the server 20 obtains apparatus information from each of the apparatuses in the host apparatus list and sends the obtained apparatus information to the image forming apparatus 10C.

When receiving the apparatus information of each of the apparatuses in the host apparatus list from the server 20, the image forming apparatus 10C selects (or determines), based on a predetermined criterion, one of the apparatuses as a host apparatus that performs a process in response to an address book information acquisition request for address book information. Then, the image forming apparatus 10C obtains the address book information from the selected apparatus to perform a synchronization process.

The server 20 may also be configured to continuously monitor the apparatuses in the host apparatus list to regularly obtain apparatus information from the apparatuses, and to send the obtained apparatus information to the image forming apparatus 10C when an apparatus information acquisition request is received from the image forming apparatus 10C.

The configuration of FIG. 2 where the server 20 includes the host apparatus list makes it easier to update the host apparatus list. Also, with the configuration where the server 20 obtains apparatus information of apparatuses in the host apparatus list in advance, it is possible to quickly respond to requests from client apparatuses.

<Functional Configuration of Image Forming Apparatus>

Figure 3:
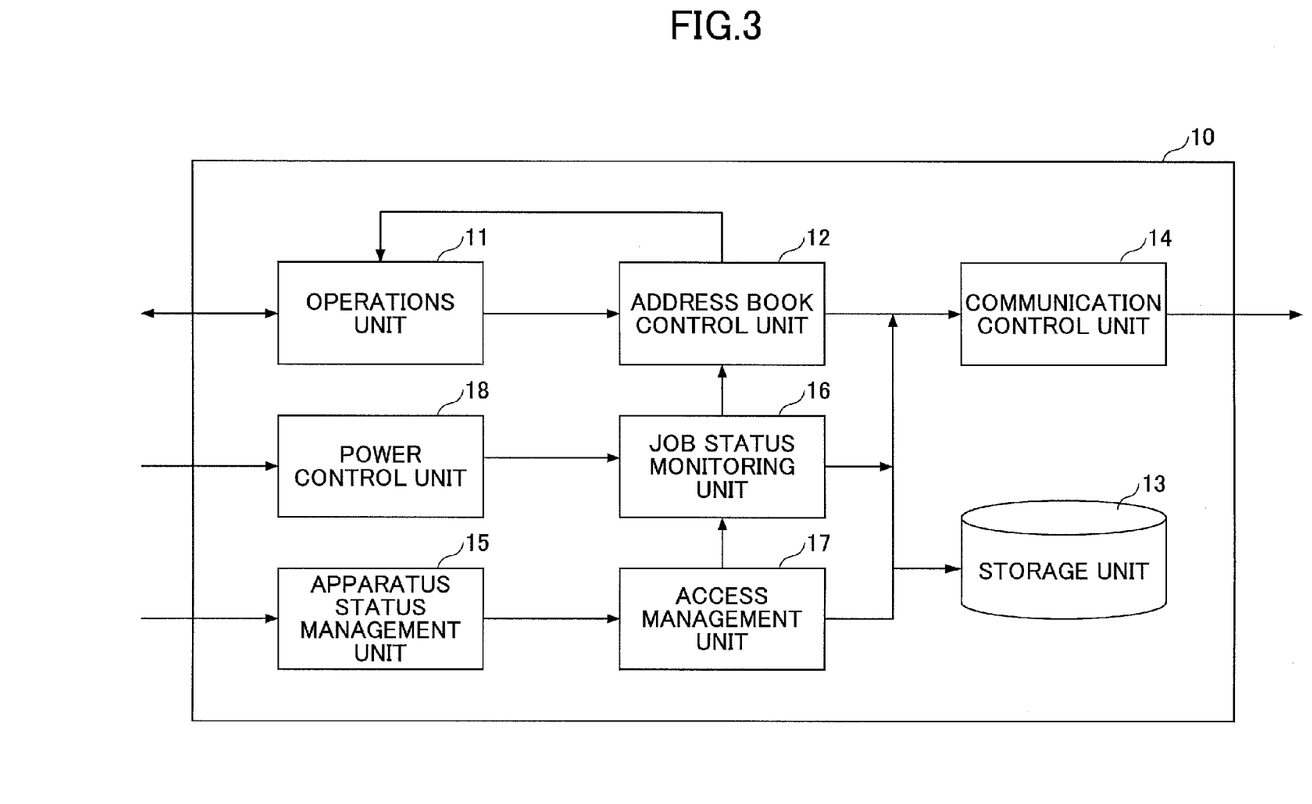
FIG. 3 is a block diagram illustrating an exemplary functional configuration of an image forming apparatus.

FIG. 3 is a block diagram illustrating an exemplary functional configuration of the image forming apparatus 10. As illustrated by FIG. 3, the image forming apparatus 10 may include an operations unit 11, an address book control unit 12, a storage unit 13, a communication control unit 14, an apparatus status management unit 15, a job status monitoring unit 16, an access management unit 17, and a power control unit 18.

The operations unit 11 is used, for example, by a user to input various commands and information, and displays screens for the user. When the image forming apparatus 10 functions as a client apparatus, the operations unit 11 receives, for example, an address book central management request entered by a user (e.g., administrator) to request a synchronization process for synchronizing an address book, and sends an address book information acquisition request to the address book control unit 12 in response to the address book central management request. The operations unit 11 may be implemented by, for example, an operations panel.

The address book control unit 12 obtains address book information and performs a synchronization process. The storage unit 13 stores various types of information used in the present embodiment. For example, the storage unit 13 stores address book information obtained by the address book control unit 12.

The storage unit 13 may also store, as apparatus information, performance information indicating the performance of hardware components of the image forming apparatus 10. The performance information may include, for example, the performance of a central processing unit (CPU), the capacity of a hard disk drive (HDD), and the capacity and/or performance of a memory.

The storage unit 13 may further store, as apparatus information, operational information of the image forming apparatus 10 used to obtain, for example, current job status, and recent log information indicating, for example, a job frequency, a power transition frequency, and an access frequency. When the image forming apparatus 10 functions as a client apparatus, the storage unit 13 may store a host apparatus list obtained in advance via, for example, the operations unit 11, and a predetermined criterion used to select a host apparatus.

The communication control unit 14 controls communications with other apparatuses connected to the network N. The apparatus status management unit 15 manages the status of the image forming apparatus 10, which indicates, for example, whether the image forming apparatus 10 is being operated. The job status monitoring unit 16 monitors, for example, a job status indicating whether a job exists (or the number of existing jobs) and a scheduled process status indicating whether a scheduled process exists (or the number of scheduled processes).

The access management unit 17 manages, for example, the status of access to the image forming apparatus 10 and a network status. The power control unit controls power on and off of the image forming apparatus 10.

<Configuration of Address Book Control Unit>

Figure 4:
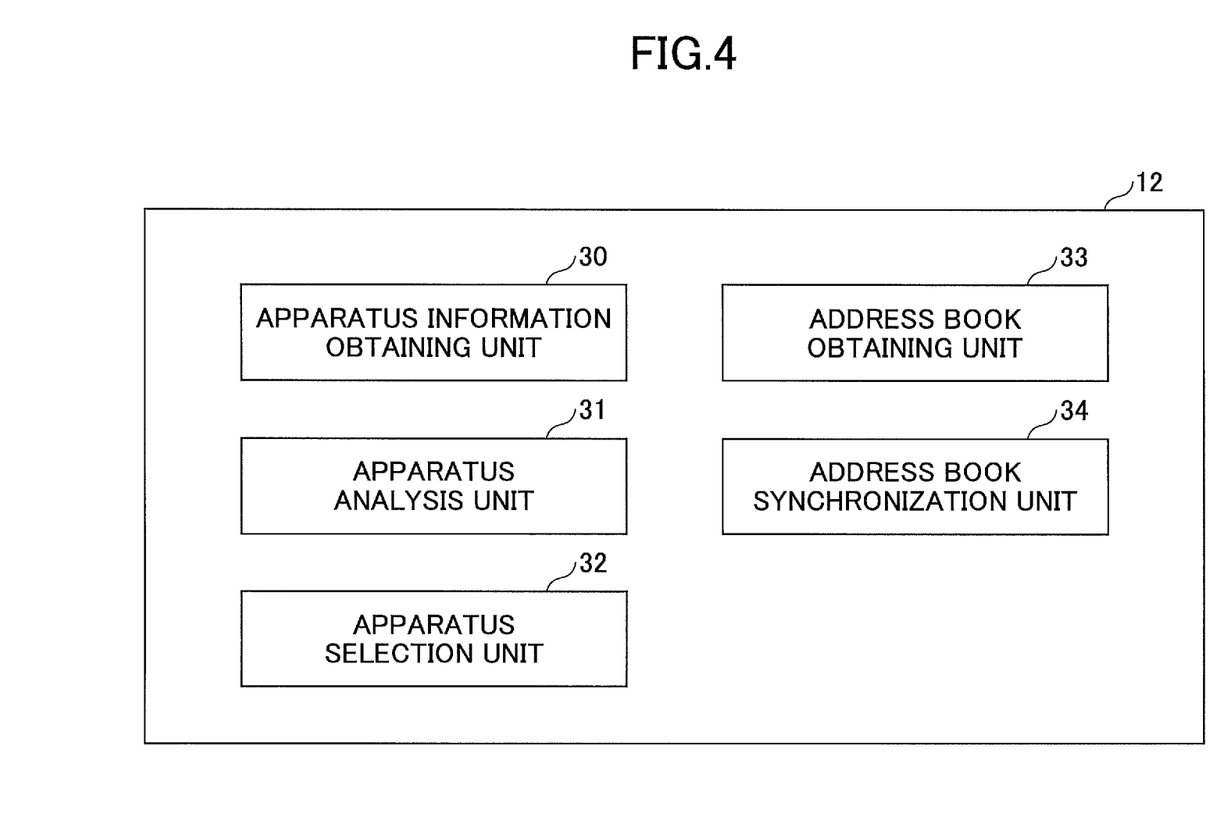
FIG. 4 is a block diagram illustrating an exemplary functional configuration of an address book control unit.

FIG. 4 is a block diagram illustrating an exemplary functional configuration of the address book control unit 12. As illustrated by FIG. 4, the address book control unit 12 may include an apparatus information obtaining unit 30, an apparatus analysis unit 31, an apparatus selection unit 32, an address book obtaining unit 33, and an address book synchronization unit (address book setting unit) 34.

When an address book information acquisition request is received via, for example, the operations unit 11, the apparatus information obtaining unit 30 refers to a host apparatus list stored in the storage unit 13 and sends an apparatus information acquisition request to each of the image forming apparatuses 10 in the host apparatus list. The apparatus information obtaining unit 30 thereby obtains apparatus information from each of the image forming apparatuses 10 in the host apparatus list.

The apparatus information may include, for example, performance information including the performance of a CPU, the performance (or capacity) of a HDD, and the performance (or capacity) of a memory of the image forming apparatus 10; and operational information including a job status, a network status, a scheduled process status indicating whether a scheduled process exists, and an operation status indicating whether the image forming apparatus 10 is being operated. The apparatus information may also include log information of the image forming apparatus 10 used to analyze the recent usage trend such as a job frequency, a power transition frequency, and an access frequency.

Based on the apparatus information obtained by the apparatus information obtaining unit 30 from each of the image forming apparatuses 10 in the host apparatus list and a predetermined criterion, the apparatus analysis unit 31 selects (or determines) one of the image forming apparatuses 10 from which address book information is to be obtained.

The predetermined criterion indicates a property or a characteristic used to prioritize the image forming apparatuses 10 and select one of the image forming apparatuses 10 suitable as a host apparatus that responds to a request (e.g., an address book information acquisition request). For example, the predetermined criterion may be the performance of a CPU, a HDD, and/or a memory, or the total performance of the image forming apparatus 10.

Also, the predetermined criterion may be a job status, a network status, a scheduled process status, and/or an operation status of the image forming apparatus 10, or the total current availability of the image forming apparatus 10. Further, the predetermined criterion may be a job frequency, a power transition frequency, and/or an access frequency, or a total usage trend (e.g., low usage rate) of the image forming apparatus 10.

For example, when the performance of the CPU is used as the predetermined criterion, the apparatus analysis unit 31 prioritizes the image forming apparatuses 10 by comparing values indicating the performance of CPUs of the image forming apparatuses 10. As another example, when the total performance is used as the predetermined criterion, the apparatus analysis unit prioritizes the image forming apparatuses 10 by comparing values indicating the total performance of the image forming apparatuses 10.

Also, a result of selection by the user may be used as the predetermined criterion. In this case, the apparatus analysis unit 31 may be configured to generate an apparatus candidate list based on the result of prioritization (which may be referred to as an "analysis result") and display the apparatus candidate list on the operations unit 11 to allow the user to select an image forming apparatus 10.

Based on the analysis result obtained by the apparatus analysis unit 31 and the predetermined criterion, the apparatus selection unit 32 selects (or determines) one of the image forming apparatuses 10 that is suitable as a host apparatus from which address book information is to be obtained. A process performed by the apparatus selection unit 32 is described later in detail.

The address book obtaining unit 33 requests the image forming apparatus 10 selected by the apparatus selection unit 32 to perform a process to provide address book information, obtains (or receives) the address book information as a result of the performed process, and sends the obtained address book information to the address book synchronization unit 34. The address book obtaining unit 33 is an example of a process result obtaining unit.

The address book synchronization unit 34 stores the address book information received from the address book obtaining unit 33 in the storage unit 13 to synchronize the address book, and outputs a message indicating whether the address book information has been successfully obtained to the operations unit 11.

The above configuration makes it possible to select a suitable apparatus as a host apparatus from multiple apparatuses connected to a network so that the selected host apparatus can quickly perform processes in response to requests from client apparatuses.

<Hardware Configuration of Image Forming Apparatus>

Figure 5:
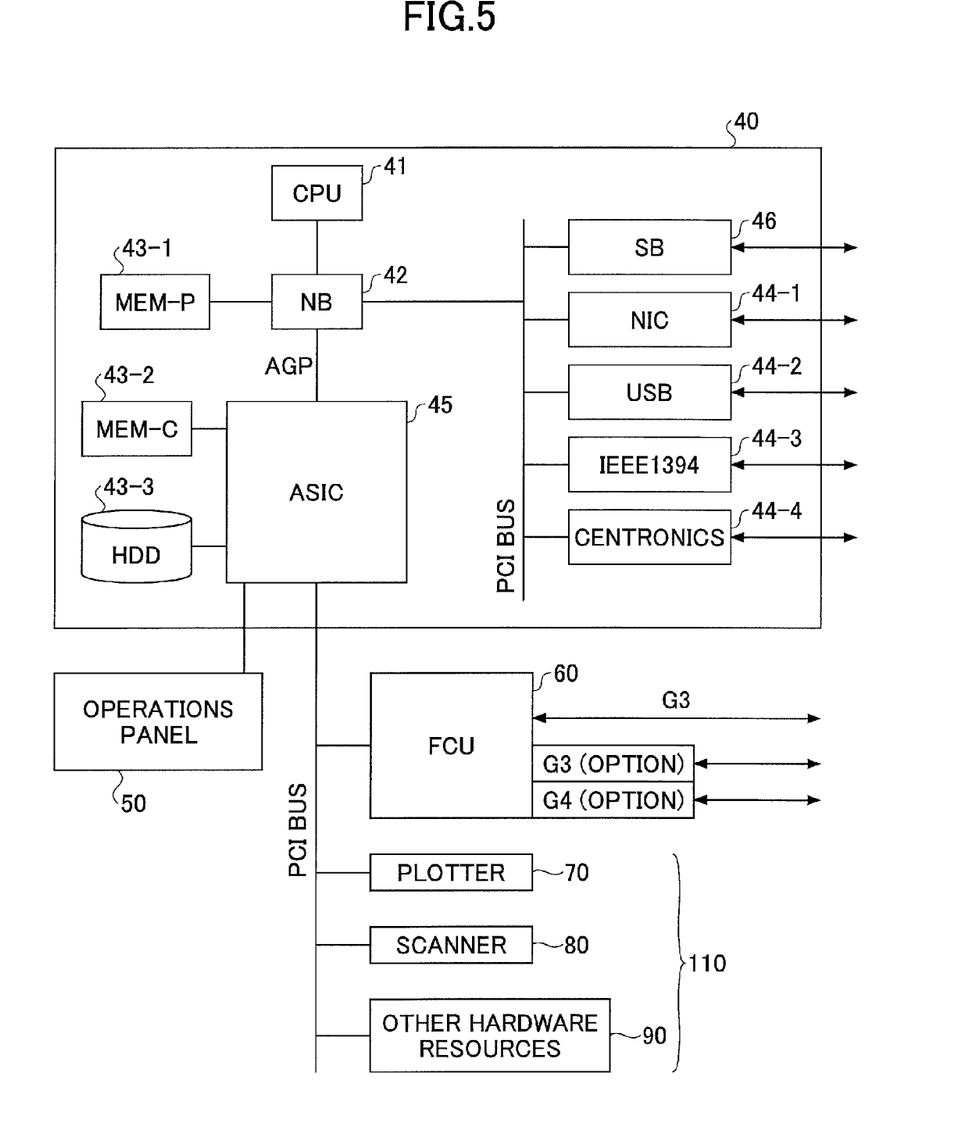
FIG. 5 is a block diagram illustrating an exemplary hardware configuration of an image forming apparatus.

FIG. 5 is a block diagram illustrating an exemplary hardware configuration of the image forming apparatus 10. The image forming apparatus 10 may include a controller 40, an operations panel 50, a facsimile control unit (FCU) 60, and an engine 110 including a plotter 70, a scanner 80, and other hardware resources 90.

The controller 40 may include a CPU 41, an NB 42, a MEM-P 43-1, a MEM-C 43-2, an HDD 43-3, and a network interface controller (NIC) 44-1. The controller 40 may also include a universal serial bus (USE) device 44-2, an IEEE 1394 device 44-3, a Centronics device 44-4, an application specific integrated circuit (ASIC) 45, and an SB 46.

The CPU 41 is an integrated circuit (IC) for information processing. The NB 42 is a northbridge of the controller 40. The MEM-P 43-1 is a system memory of the image forming apparatus 10. The MEM-C 43-2 is a local memory of the image forming apparatus 10. The HDD 43-3 is a storage of the image forming apparatus 10.

The NIC 44-1 is a controller for network communications via a Media Access Control (MAC) address. The USB device 44-2 is an interface or a connector complying with the USB standards. The IEEE 1394 device 44-3 is an interface or a connector complying with the IEEE 1394 standards. The Centronics device 44-4 is an interface or a connector complying with the Centronics specification.

The ASIC 45 is an IC for image processing. The SB 46 is a southbridge of the controller 40.

The operations panel 50 is a hardware component that functions both as an input unit used by a user (or operator) to input information and commands into the image forming apparatus 10 and as a display unit for displaying information output from the image forming apparatus 10. The FCU 60 sends and receives facsimile data according to the G3 standard and stores received facsimile data. The FCU 60 may support both of the G3 standard and the G4 standard. The plotter 70 performs printing. The scanner 80 scans a document and generates document data.

The scanner 80 and the FCU 60 may be omitted from the image forming apparatus 10. The hardware configuration illustrated by FIG. 5 is just an example, and the image forming apparatus 10 may have a hardware configuration that is different from FIG. 5. The image forming apparatuses 10A through 10C may have the same hardware configuration or different hardware configurations.

<Process of Obtaining Address Book Information>

Figure 6A:
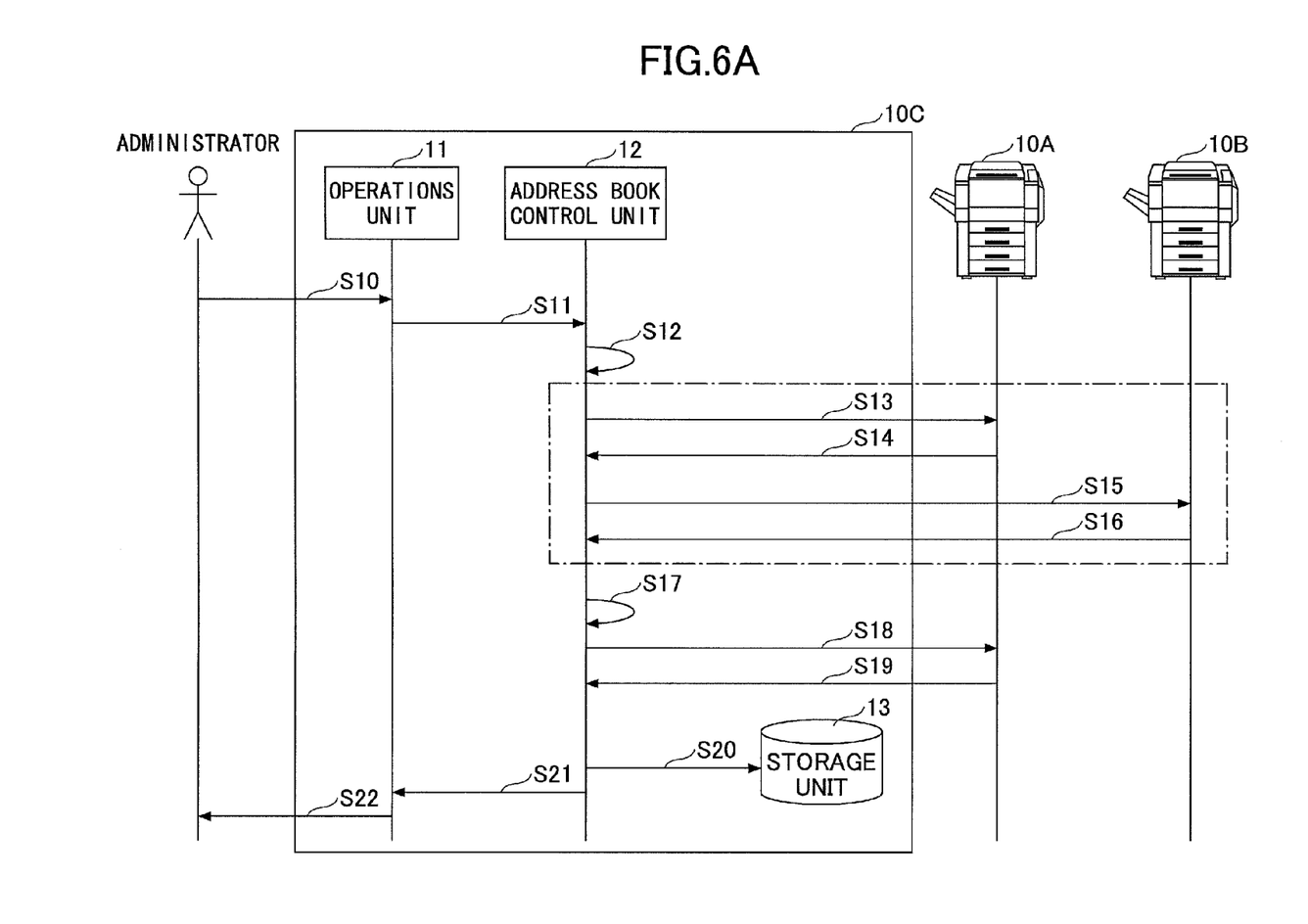
FIG. 6A is a sequence chart illustrating an exemplary process of obtaining address book information.

FIG. 6A is a sequence chart illustrating an exemplary process of obtaining address book information. As illustrated by FIG. 6A, the image forming apparatus 10C (a client apparatus in this example) receives an address book central management request, which is for requesting synchronization of an address book, from a user (e.g., an administrator) via the operations unit 11 (S10). Then, the operations unit 11 sends an address book information acquisition request to the address book control unit 12 (S11).

When receiving the address book information acquisition request, the address book control unit 12 refers to a host apparatus list stored in the storage unit 13 (S12), sends an apparatus information acquisition request to the image forming apparatus 10A in the host apparatus list (S13), and obtains apparatus information from the image forming apparatus 10A (S14).

Similarly, the address book control unit 12 sends an apparatus information acquisition request to the image forming apparatus 10B in the host apparatus list (S15), and obtains apparatus information from the image forming apparatus 10B (S16). Thus, the address book control unit 12 performs steps S13 and S14 (or S15 and S16) for the number of apparatuses in the host apparatus list.

Next, based on the apparatus information obtained at steps S14 and S16 and a predetermined criterion, the address book control unit 12 selects (or determines) one of the image forming apparatuses 10A and 10B as a host apparatus from which address book information is to be obtained (S17). In the exemplary process of FIG. 6A, it is assumed that the image forming apparatus 10A is selected as a host apparatus.

The address book control unit 12 sends an address book information acquisition request to the image forming apparatus 10A (S18), and obtains address book information from the image forming apparatus 10A (S19). The address book control unit 12 stores the obtained address book information in the storage unit 13 to synchronize the address book (or to set or update the address book information) (S20).

Figure 6B:
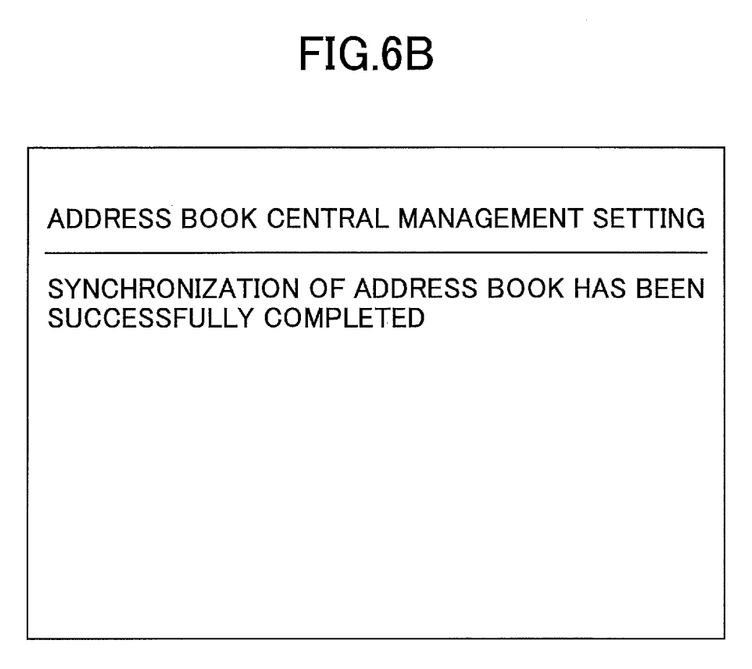
FIG. 6B is a drawing illustrating an exemplary screen indicating a result of the process of FIG. 6A.

Next, the address book control unit 12 outputs a message indicating whether the address book information has been successfully obtained to the operations unit 11 (S21). The operations unit 11 displays the message received from the address book control unit 12 on a screen (S22) to report a result of the process to the user. FIG. 6B is a drawing illustrating an exemplary screen (address book central management setting screen) indicating a result of the process of FIG. 6A. In this example, a message "Synchronization of address book has been successfully completed" is displayed on the screen.

Thus, the present embodiment makes it possible to select a suitable apparatus as a host apparatus from multiple apparatuses connected to a network so that the selected host apparatus can quickly perform processes in response to requests from client apparatuses.

<Another Process of Obtaining Address Book Information>

Figure 7A:
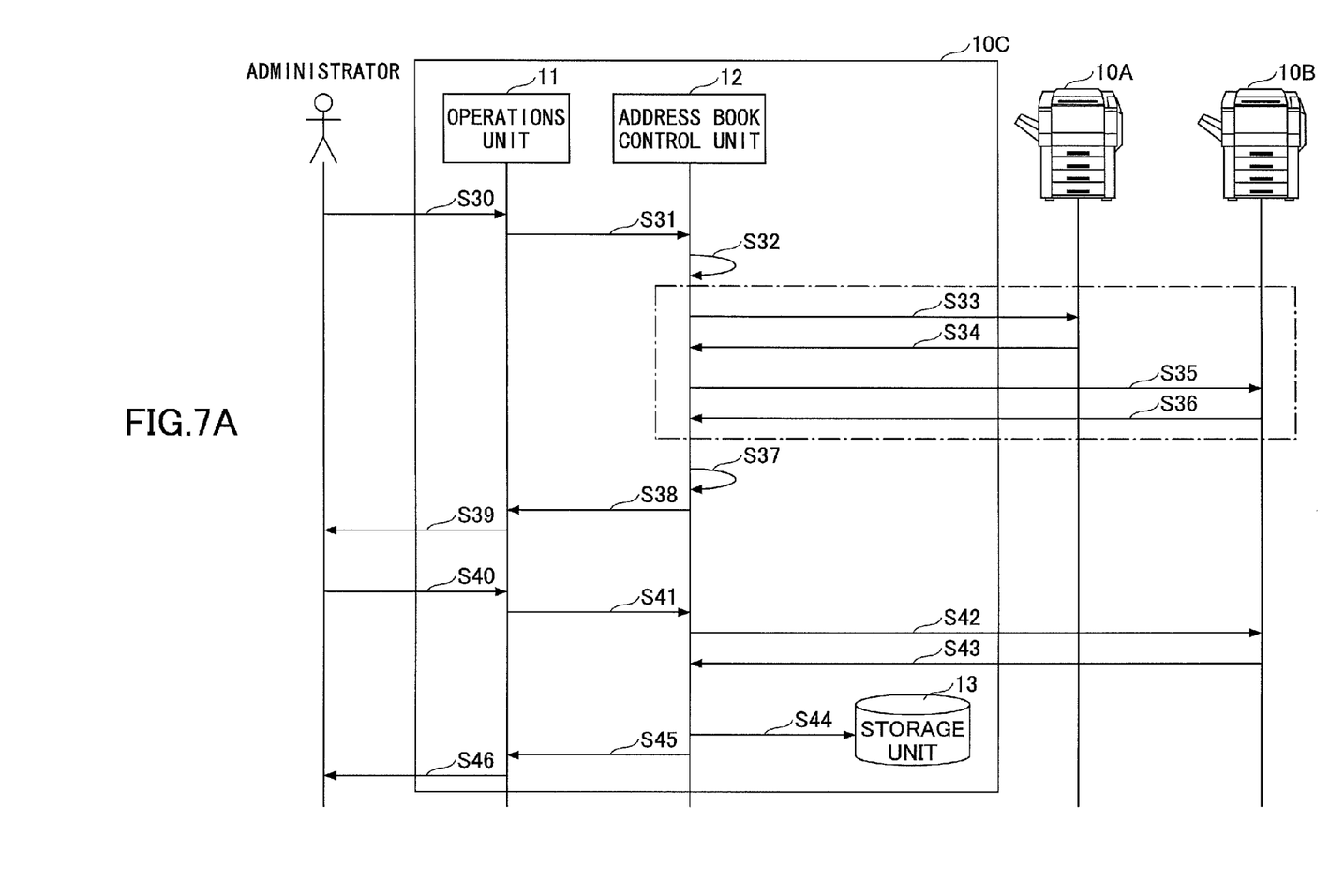
FIG. 7A is a sequence chart illustrating another exemplary process of obtaining address book information.

FIG. 7A is a sequence chart illustrating another exemplary process of obtaining address book information. The process of FIG. 7A is different from the process of FIG. 6A in that a user (e.g., an administrator) selects a host apparatus from which address book information is to be obtained. The difference between the processes of FIG. 7A and FIG. 6A is mainly described below.

Steps S30 through S36 of FIG. 7A are substantially the same as steps S10 through S17 of FIG. 6A, and therefore their descriptions are omitted here. Also, steps S44 through S46 of FIG. 7A are substantially the same as steps S20 through S22 of FIG. 6A, and their descriptions are omitted here.

At steps S34 and S36 of FIG. 7A, the address book control unit 12 of the image forming apparatus 10C obtains apparatus information of each of the image forming apparatuses 10A and 10B in the apparatus list. When the predetermined criterion is a result of selection by the user, the address book control unit 12 generates an apparatus candidate list from which a host apparatus is selected by the user (S37), and sends the apparatus candidate list to the operations unit 11 (S38).

The operations unit 11 displays the apparatus candidate list on a screen (apparatus candidate list screen) (S39). When an apparatus is selected by the user from the apparatus candidate list (S40), the operations unit 11 reports the selected apparatus to the address book control unit 12 (S41). The address book control unit 12 determines the selected apparatus reported at step S41 as a host apparatus and sends an address book information acquisition request to the host apparatus (S42), and obtains address book information from the host apparatus (S43). In the exemplary process of FIG. 7A, it is assumed that the image forming apparatus 10B is selected as a host apparatus.

Figure 7B:
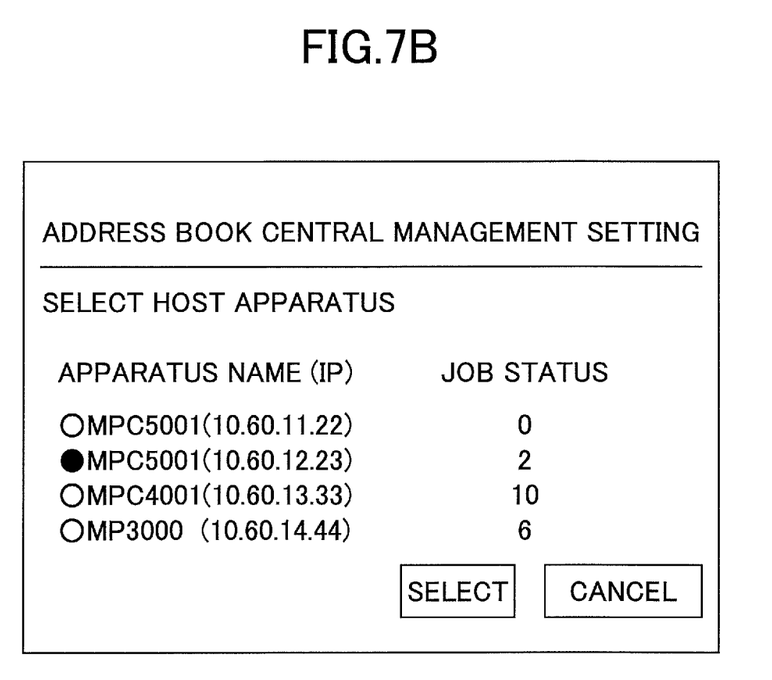
FIG. 7B is a drawing illustrating an exemplary candidate apparatus list screen.

FIG. 7B is a drawing illustrating an exemplary candidate apparatus list screen displayed at step S39. The candidate apparatus list screen includes the names and IP addresses of the apparatuses (MPC5001 (10.60.11.22), MPC5001 (10.60.12.23), MPC4001 (10.60.13.33), and MP3000 (10.60.14.44)) and the job status (e.g., the number of jobs) of each of the apparatuses. The type of apparatus information displayed together with the apparatus name is not limited to the job status. For example, the network status or the scheduled process status may be displayed with the apparatus name. Also, two or more types of apparatus information may be displayed with each apparatus name.

In the example of FIG. 7B, MPC5001 (10.60.11.22) has the smallest number of jobs. When the job status (i.e., the number of jobs) is used as the predetermined criterion, MPC5001 (10.60.11.22) is selected as a host apparatus. However, because a selection by the user is used as the predetermined criterion in the case of FIG. 7A, MPC5001 (10.60.12.23) selected by the user on the candidate apparatus list screen is determined as a host apparatus.

Thus, the method or configuration of FIG. 7A enables the user to select a host apparatus from an apparatus candidate list taking into account the result of analyzing apparatus information. This method or configuration also allows the user to select a host apparatus by preference (e.g., a frequently-used apparatus, an apparatus with a low failure rate, or a new apparatus).

<Process of Obtaining Apparatus Information Via Server>

Figure 8:
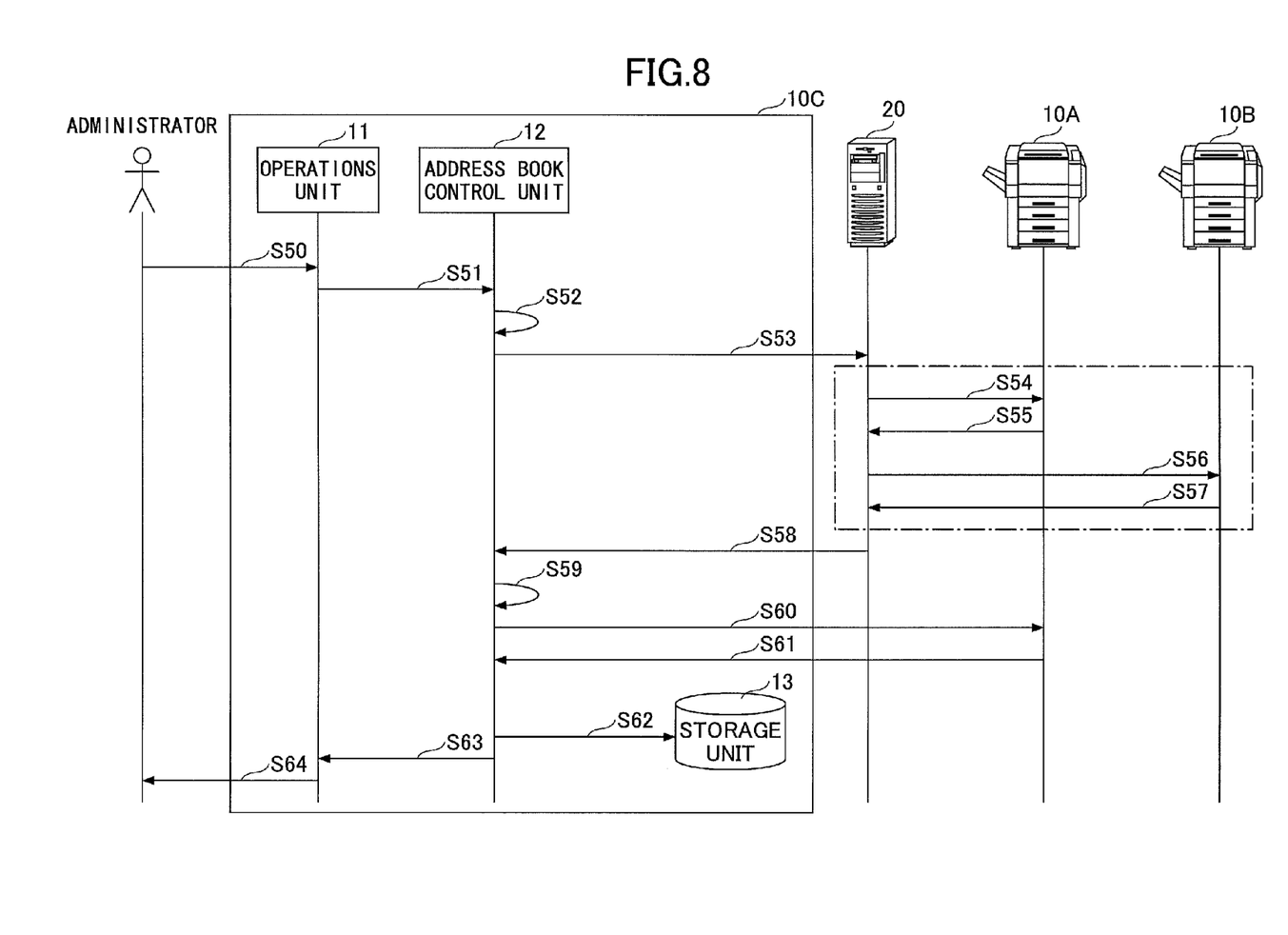
FIG. 8 is a sequence chart illustrating an exemplary process of obtaining apparatus information via a server.

An exemplary process of obtaining apparatus information via the server 20 (see FIG. 2) is described below. FIG. 8 is a sequence chart illustrating an exemplary process of obtaining apparatus information via the server 20.

The process of FIG. 8 is different from the process of FIG. 6A in that the server 20 stores a host apparatus list, and apparatus information of apparatuses in the host apparatus list is obtained via the server 20. The difference between the processes of FIG. 8 and FIG. 6A is mainly described below.

Steps S50 and S51 of FIG. 8 are substantially the same as steps S10 and S11 of FIG. 6A, and therefore their descriptions are omitted here. Also, steps S59 through S64 of FIG. 8 are substantially the same as steps S17 through S22 of FIG. 6A, and their descriptions are omitted here.

When an address book information acquisition request is received via the operations unit 11 (S52), the address book control unit 12 of the image forming apparatus 10C sends an apparatus information acquisition request to the server 20 to request the server 20 to obtain apparatus information of apparatuses in the host apparatus list (S53).

The server 20 sends an apparatus information acquisition request to the image forming apparatus 10A in the host apparatus list (S54), and obtains apparatus information from the image forming apparatus 10A (S55). Similarly, the server 20 sends an apparatus information acquisition request to the image forming apparatus 10B in the host apparatus list (S56), and obtains apparatus information from the image forming apparatus 10B (S57).

The server 20 sends the apparatus information obtained at steps S55 and S57 to the address book control unit 12 of the image forming apparatus 10C (S58). Next, based on the apparatus information received from the server 20 and a predetermined criterion, the address book control unit 12 selects (or determines) one of the image forming apparatuses 10A and 10B as a host apparatus from which address book information is to be obtained (S59).

With the configuration where the server 20 stores a host apparatus list, it is possible to easily update the host apparatus list.

<Another Process of Obtaining Apparatus Information Via Server>

Figure 9:
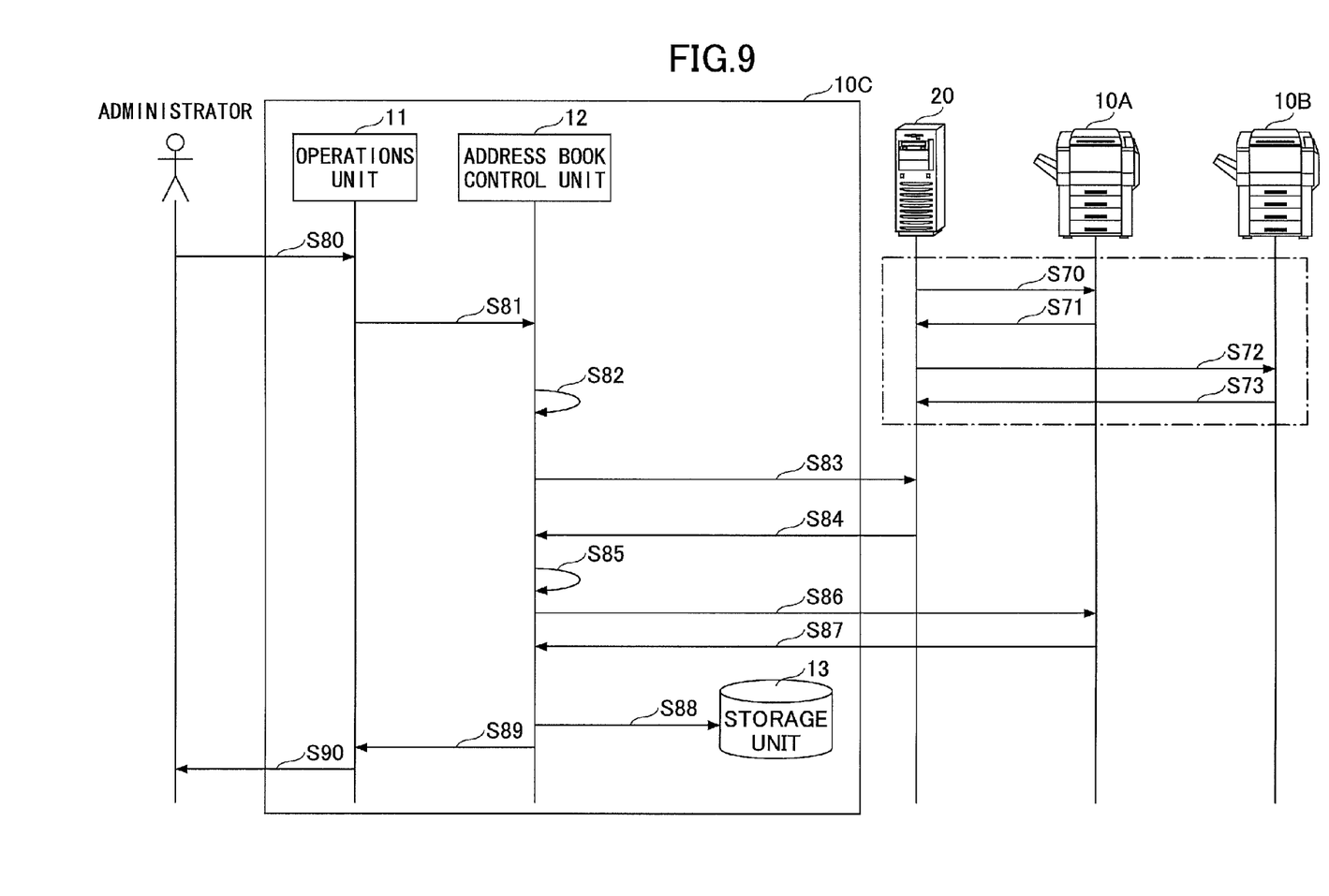
FIG. 9 is a sequence chart illustrating another exemplary process of obtaining apparatus information via a server.

FIG. 9 is a sequence chart illustrating another exemplary process of obtaining apparatus information via the server 20. The process of FIG. 9 is different from the process of FIG. 8 in that the server 20 regularly obtains apparatus information from apparatuses in a host apparatus list. The difference between the processes of FIG. 9 and FIG. 8 is mainly described below.

Steps S80 through S83 of FIG. 9 are substantially the same as steps S50 through S53 of FIG. 8, and therefore their descriptions are omitted here. Also, steps S85 through S90 of FIG. 9 are substantially the same as steps S59 through S64 of FIG. 8, and their descriptions are omitted here.

In the example of FIG. 9, the server 20 continuously monitors the status of apparatuses in a host apparatus list. For example, the server 20 sends, at regular intervals, an apparatus information acquisition request to the image forming apparatus 10A in the host apparatus list (S70), and obtains apparatus information from the image forming apparatus 10A (S71). Similarly, the server 20 sends, at regular intervals, an apparatus information acquisition request to the image forming apparatus 10B in the host apparatus list (S72), and obtains apparatus information from the image forming apparatus 10B (S73).

When an apparatus information acquisition request for requesting apparatus information of apparatuses in the host apparatus list is received from the address book control unit 12 of the image forming apparatus 10C (S83), the server 20 sends the apparatus information obtained at steps S71 and S73 to the address book control unit 12 (S84). Based on the apparatus information received from the server 20 and a predetermined criterion, the address book control unit 12 selects (or determines) one of the image forming apparatuses 10A and 10B as a host apparatus from which address book information is to be obtained (S85).

The method or configuration of FIG. 9 where the server 20 regularly obtains apparatus information from apparatuses in the host apparatus list enables the server 20 to quickly respond to a request from the image forming apparatus 10C.

<Process of Selecting Host Apparatus>

Figure 10:
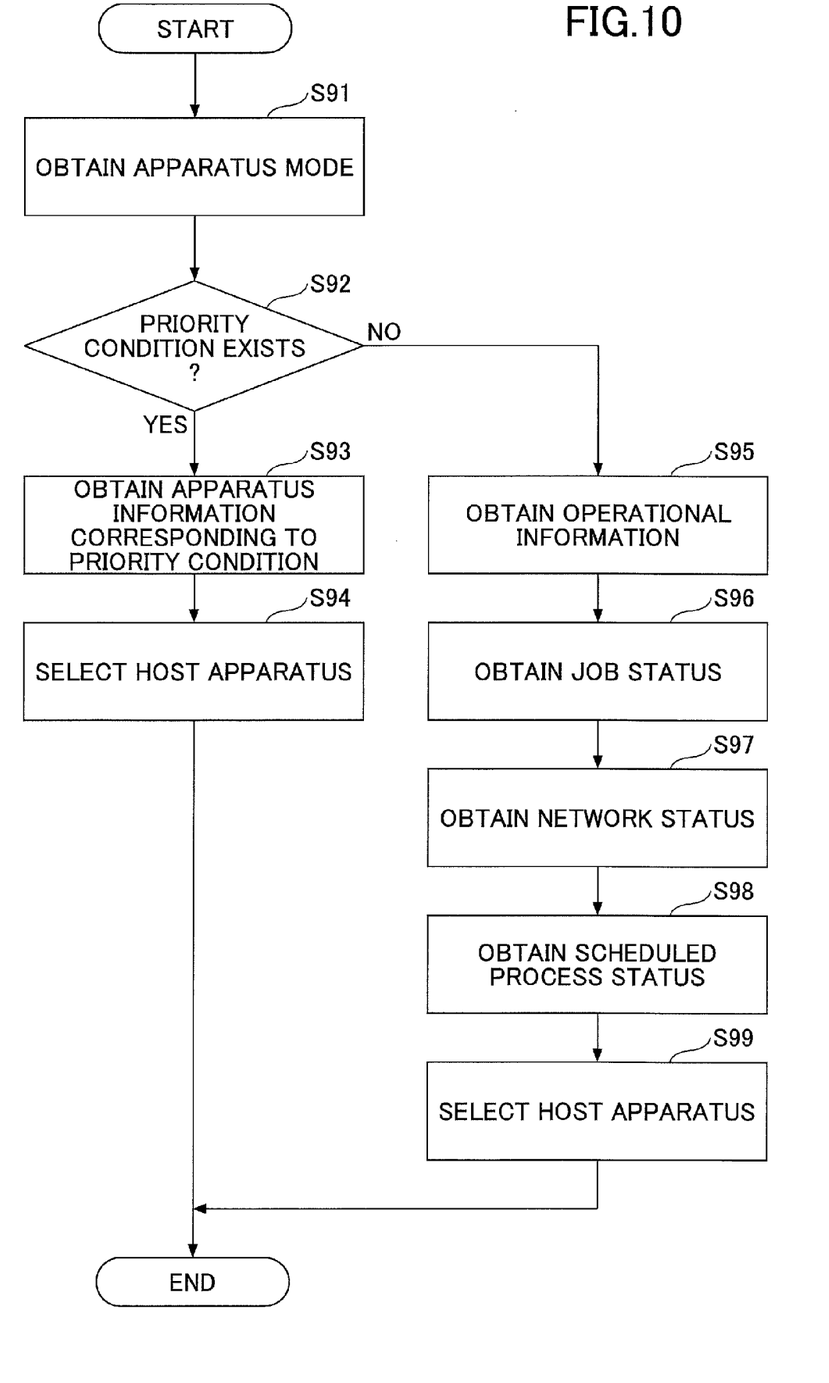
FIG. 10 is a flowchart illustrating an exemplary process of selecting a host apparatus.

FIG. 10 is a flowchart illustrating an exemplary process of selecting a host apparatus. When an address book information acquisition request is received via the operations unit 11, the address book control unit obtains an apparatus mode from, for example, the storage unit 13 (S91) and determines, based on the apparatus mode, whether a priority condition for the address book information acquisition request exists (S92).

Here, the priority condition indicates the predetermined criterion described above. In the exemplary process of FIG. 10, when the priority condition does not exist, the total current availability (i.e., non-busyness) of respective apparatuses is determined based on operational information of the apparatuses, and a host apparatus is selected (or determined) based on the total current availability.

When a priority condition exists (YES at S92), the address book control unit 12 obtains apparatus information of the apparatuses corresponding to the priority condition (in this example, the performance of CPU) (S93), and selects a host apparatus based on the performance of CPU of the apparatuses (S94).

On the other hand, when no priority condition exists (NO at S92), the address book control unit 12 obtains operational information of the apparatuses (S95), and obtains the job status (S96), the network status (S97), and the scheduled process status (S98) of the respective apparatuses from the operational information.

Next, the address book control unit 12 determines the total current availability of the respective apparatuses based on the job status, the network status, and the scheduled process status obtained at steps S96 through S98, selects (or determines) one of the apparatuses as a host apparatus based on the total current availability (S99), and terminates the process. Step S99 is described in more detail later.

<Host Apparatus List>

Figure 11:
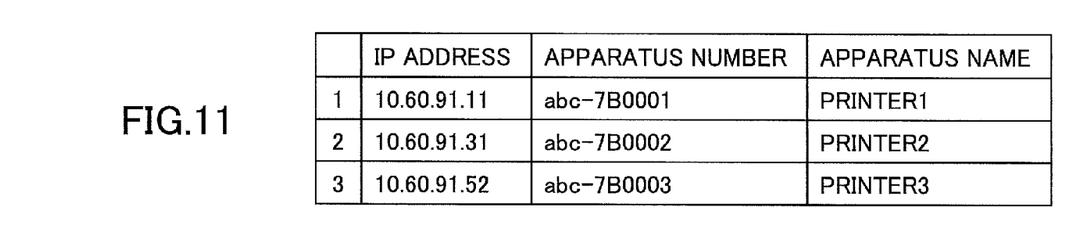
FIG. 11 is a table illustrating an exemplary host apparatus list.

FIG. 11 is a table illustrating an exemplary host apparatus list. As illustrated by FIG. 11, the host apparatus list may include an "IP address" field, an "apparatus number" field, and an "apparatus name" field. According to the present embodiment, each of host apparatuses in the host apparatus list stores the latest address book information. Therefore, a client apparatus can obtain the latest address book information from any one of the apparatuses in the host apparatus list.

When an address book information acquisition request is received via the operations unit 11, the address book control unit 12 or the server 20 sends an apparatus information acquisition request to each of apparatuses in the host apparatus list based on IP addresses of the apparatuses in the host apparatus list.

The host apparatus list may be stored in advance in the storage unit 13 of the image forming apparatus 10 that serves as a client apparatus, or may be entered by the user via the operations unit 11. The host apparatus list may be updated when address book information of an apparatus is synchronized. The updated host apparatus list including the apparatus whose address book information has been synchronized may be reported via the network N to client apparatuses. Alternatively, the host apparatus list may be updated via the operations unit 11.

That is, when a client apparatus obtains the latest address book information from a host apparatus, the client apparatus may be added to the host apparatus list as a new host apparatus. This enables a client apparatus to select a host apparatus from a larger number of apparatuses.

<Operational Information>

Figure 12:
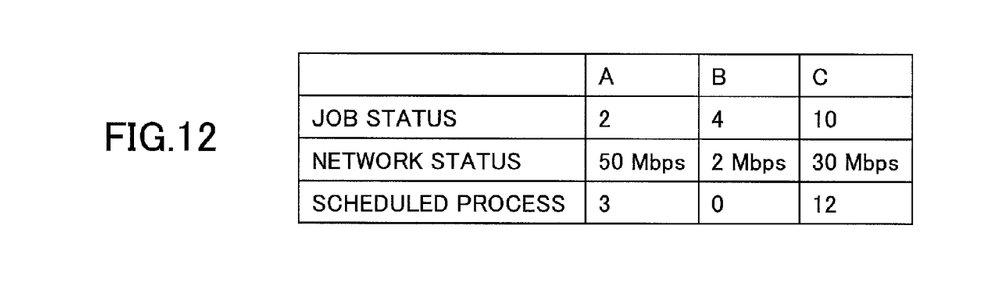
FIG. 12 is a table illustrating exemplary operational information of apparatuses.

FIG. 12 is a table illustrating exemplary operational information of apparatuses. The operational information is an example or a part of apparatus information.

When operational information as illustrated by FIG. 12 is obtained from apparatuses A through C in a host apparatus list, the apparatus analysis unit 31 generates a data table including a job status, a network status, and a scheduled process status for each of the apparatuses A through C.

When the total current availability is used as the predetermined criterion, a host apparatus may be selected based on the total of points that are assigned based on evaluation results to the job status, the network status, and the scheduled process status.

<Data Table>

Figure 13:
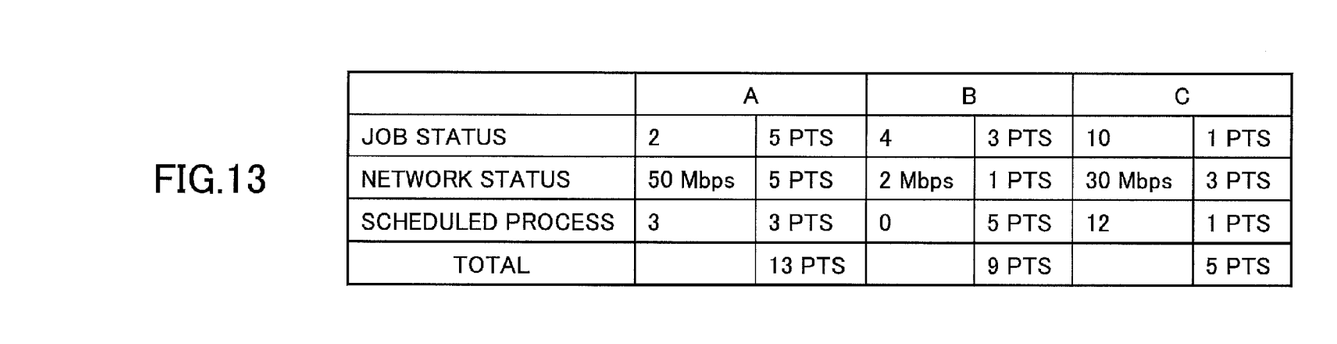
FIG. 13 is an exemplary data table used in an apparatus determining process.

FIG. 13 is an exemplary data table used in an apparatus determining process. In the data table of FIG. 13, information items in respective categories (job status, network status, and scheduled process status) are evaluated, and points are assigned to the information items of each of the apparatuses A, B, and C based on the evaluation results. In this example, five points are assigned to the first ranked information item in each category, three points are assigned to the second ranked information item in the category, and one point is assigned to the third ranked information item in the category.

In the case of the job status, a higher score is assigned to a lower number of jobs. In the case of the network status, a higher score is assigned to a higher transmission rate. In the case of the scheduled process status, a higher score is assigned to a lower number of scheduled processes.

In the example of FIG. 13, the job status (the number of jobs) of the apparatus A is two that is less than the job status (the number of jobs) of the apparatuses B and C. Therefore, five points are assigned to the job status of the apparatus A. Also, the network status (transmission rate) of the apparatus A is 50 Mbps that is greater than the network status (transmission rate) of the apparatuses B and C. Therefore, five points are assigned to the network status of the apparatus A. In this manner, points are assigned to respective information items, the total points assigned to each apparatus are obtained, and one of the apparatuses with the highest total points is selected as a host apparatus.

As described above, the present embodiment makes it possible to select a suitable apparatus as a host apparatus from multiple apparatuses connected to a network so that the selected host apparatus can quickly perform processes in response to requests from client apparatuses. The above embodiment is described using an exemplary case where address book information is obtained from a host apparatus. However, the present invention may also be applied to a case where a different type of information such as apparatus usage information or counter information is obtained from a host apparatus.

An information apparatus and an information processing system according to preferred embodiments of the present invention are described above. However, the present invention is not limited to the specifically disclosed embodiments, and variations and modifications may be made without departing from the scope of the present invention. For example, the present invention may be implemented as an information processing method performed by an information apparatus and as a non-transitory computer-readable storage medium storing a program for causing an information apparatus to perform the information processing method.

What is claimed is:

1. An information apparatus, comprising:
an apparatus information obtaining unit that obtains apparatus information directly from each of a plurality of apparatuses connected via a network to the information apparatus in response to a request to execute a process;
an apparatus selection unit that selects a target apparatus to execute the process from the plurality of apparatuses based on the obtained apparatus information; and
a process result obtaining unit that requests the target apparatus to execute the process corresponding to the request, and obtains a result of the executed process from the target apparatus,
wherein the apparatus information obtaining unit
determines whether a priority condition corresponding to the request exists, and
obtains the apparatus information corresponding to the priority condition from each of the plurality of apparatuses when the priority condition exists.

2. The information apparatus as claimed in claim 1, wherein the apparatus information obtaining unit obtains the apparatus information including at least one of performance information, operational information, and log information of each of the plurality of apparatuses.

3. The information apparatus as claimed in claim 1, wherein the request is one of an acquisition request to obtain information commonly held by the plurality of apparatuses from the target apparatus and an authentication request to request the target apparatus to authenticate the information apparatus.

4. The information apparatus as claimed in claim 3, wherein the process result obtaining unit sends the acquisition request to the target apparatus to synchronize information stored in the information apparatus with the information commonly held by the plurality of apparatuses.

5. The information apparatus as claimed in claim 1, further comprising: an apparatus analysis unit that analyzes at least one of a performance, a current availability, and a usage trend of each of the plurality of apparatuses based on the apparatus information and a predetermined criterion, wherein the apparatus selection unit selects the target apparatus from the plurality of apparatuses based on an analysis result of the apparatus analysis unit and the predetermined criterion.

6. The information apparatus as claimed in claim 1, further comprising:
a storage unit that stores an apparatus list including identification information of the plurality of apparatuses, wherein the apparatus information obtaining unit obtains the apparatus information from the plurality of apparatuses by referring to the apparatus list.

7. An information processing system, comprising:
a plurality of first apparatuses; and
a second apparatus connected via a network to the plurality of first apparatuses,
wherein the second apparatus includes
an apparatus information obtaining unit that obtains apparatus information directly from each of the plurality of first apparatuses in response to a request to execute a process;
an apparatus selection unit that selects a target apparatus to execute the process from the plurality of first apparatuses based on the obtained apparatus information; and
a process result obtaining unit that requests the target apparatus to execute the process corresponding to the request, and obtains a result of the executed process from the target apparatus, and wherein the apparatus information obtaining unit
  determines whether a priority condition corresponding to the request exists, and
  obtains the apparatus information corresponding to the priority condition from each of the plurality of first apparatuses when the priority condition exists.

8. The information processing system as claimed in claim 7, wherein the second apparatus further includes a storage unit that stores an apparatus list including identification information of the plurality of first apparatuses; and wherein the apparatus information obtaining unit obtains the apparatus information from the plurality of first apparatuses by referring to the apparatus list.

9. An information processing system, comprising:
  a plurality of first apparatuses;
  a second apparatus; and
  an external apparatus that is connected via a network to the plurality of first apparatuses and the second apparatus and stores apparatus information of the plurality of first apparatuses,
  wherein the second apparatus includes
    an apparatus information obtaining unit that obtains the apparatus information of the plurality of first apparatuses from the external apparatus in response to a request to execute a process;
    an apparatus selection unit that selects a target apparatus to execute the process from the plurality of first apparatuses based on the obtained apparatus information; and
    a process result obtaining unit that requests the target apparatus to execute the process corresponding to the request, and receives directly from the target apparatus, process information as a result of the executed process, and
  wherein the apparatus information obtaining unit
    determines whether a priority condition corresponding to the request exists, and
    obtains the apparatus information corresponding to the priority condition from the external apparatus when the priority condition exists.

10. The information processing system as claimed in claim 9,
  wherein the external apparatus also stores an apparatus list including identification information of the plurality of first apparatuses; and
  wherein the external apparatus obtains the apparatus information from the plurality of first apparatuses by referring to the apparatus list.

11. The information apparatus as claimed in claim 1, wherein when the priority condition does not exist, the apparatus information obtaining unit obtains operational information of each of the plurality of first apparatuses as the apparatus information.

12. The information processing system as claimed in claim 7, wherein when the priority condition does not exist, the apparatus information obtaining unit obtains operational information of each of the plurality of first apparatuses as the apparatus information.

13. The information processing system as claimed in claim 9, wherein when the priority condition does not exist, the apparatus information obtaining unit obtains operational information of each of the plurality of first apparatuses as the apparatus information.

* * * * *